Feb. 20, 1968  R. MURPHY  3,369,503
CRUNCH MAKING MACHINE
Filed May 4, 1965  3 Sheets-Sheet 1
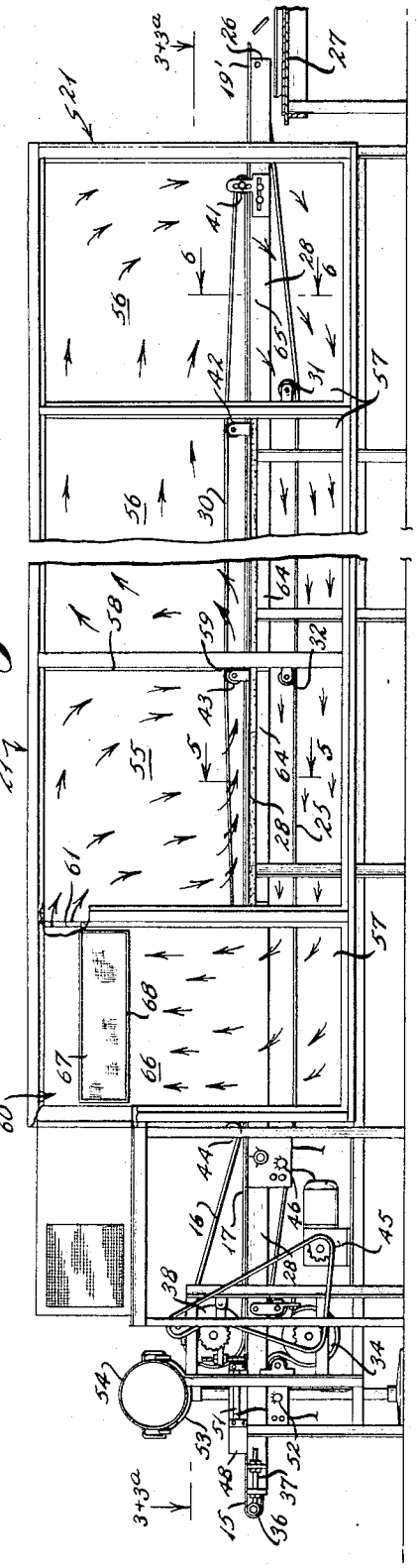
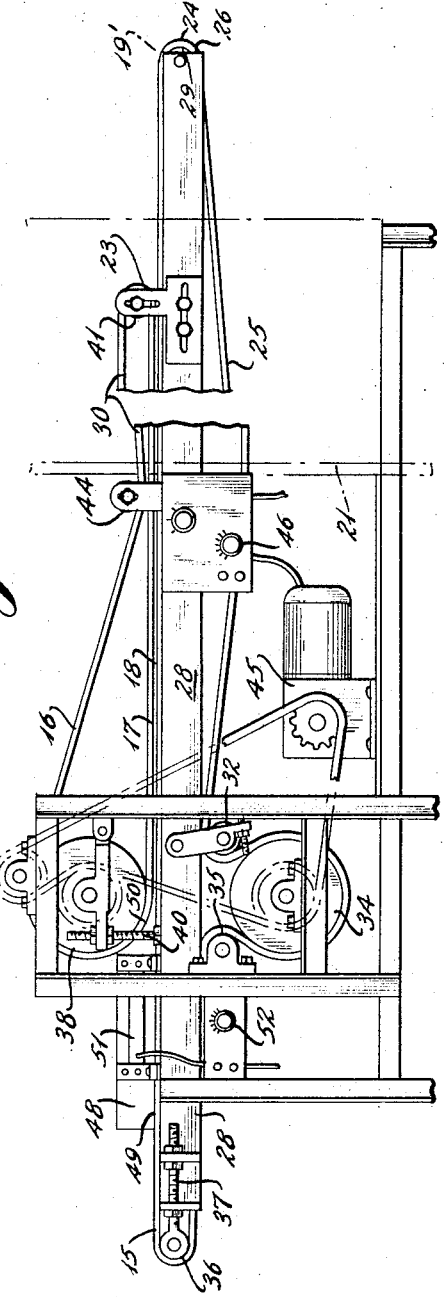
INVENTOR
Robert Murphy
BY
ATTORNEYS

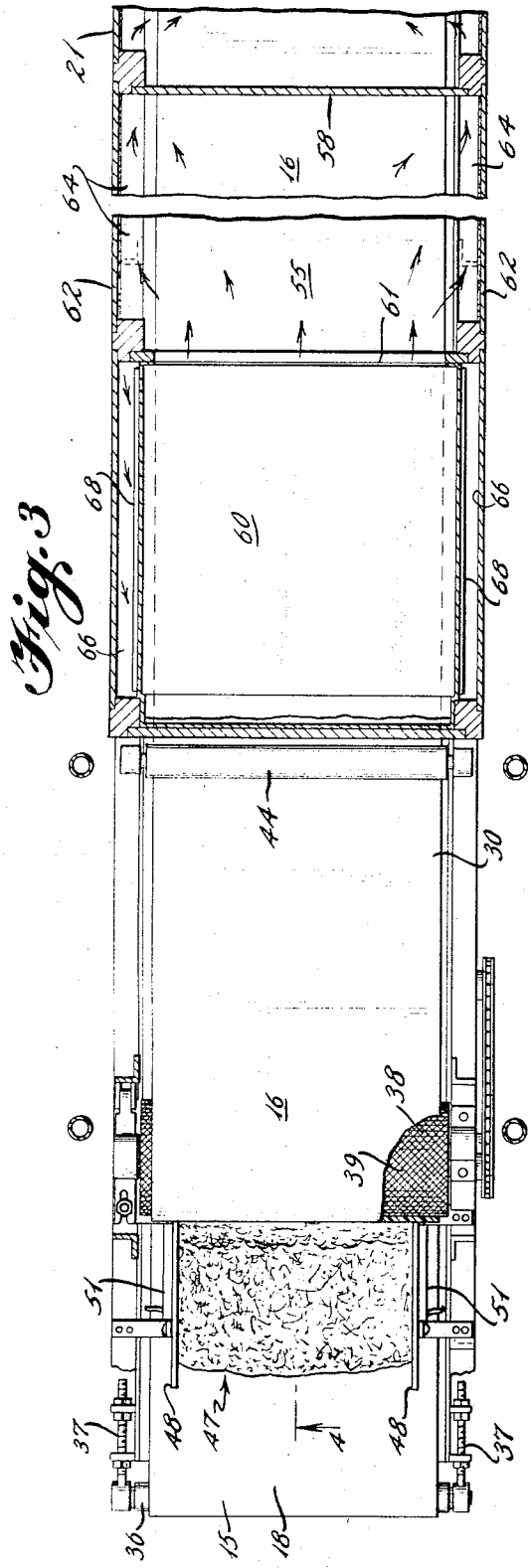
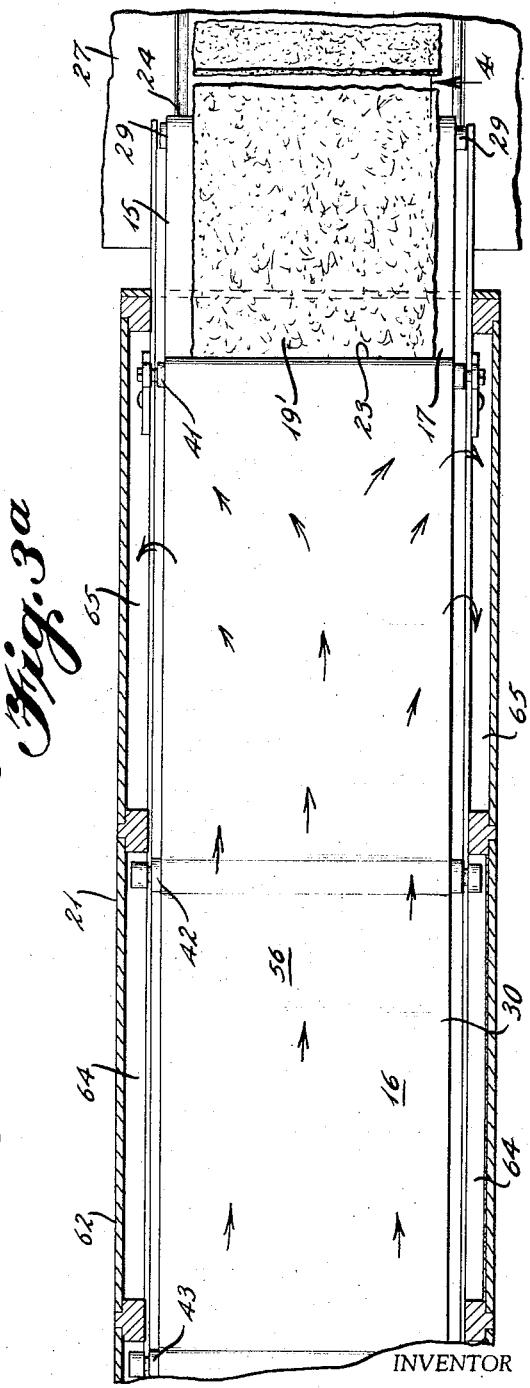

Feb. 20, 1968  R. MURPHY  3,369,503
CRUNCH MAKING MACHINE
Filed May 4, 1965  3 Sheets-Sheet 3
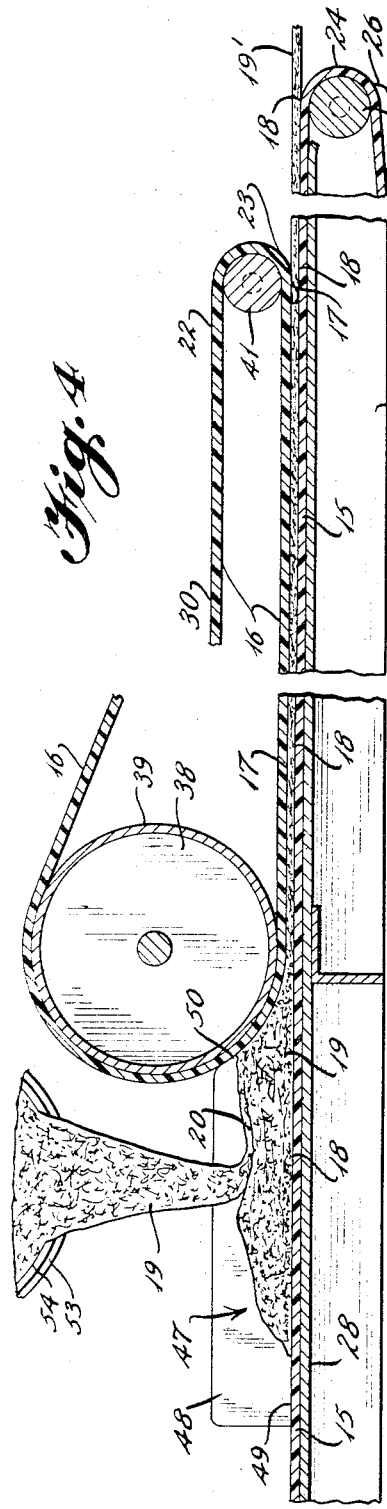
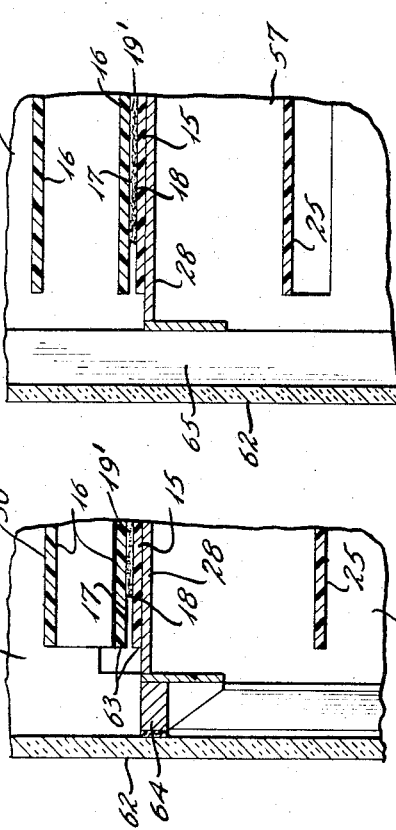
INVENTOR
Robert Murphy
BY
ATTORNEYS 3,369,503
         CRUNCH MAKING MACHINE
Robert Murphy, Robinson, Ill., assignor to L. S. Heath &
         Sons, Inc., Robinson, Ill.
      Filed May 4, 1965, Ser. No. 453,036
             13 Claims. (Cl. 107—4)

ABSTRACT OF THE DISCLOSURE

A method of making a bite size confection having smooth upper and lower surfaces and irregular side edges includes the step of placing a confection mixture upon a lower moving smooth belt 15 at a temperature high enough to permit plastic shaping and thereafter shaping it by the pressure exerted by a compression roller 39 upper belt 16 which presses the mass into sheet form. The upper and lower belts with the sheet of candy therebetween are moved through a cooling tunnel 21 until the product has sufficiently cooled so that the upper belt 16 can be separated therefrom without the confection sticking to it. The sheet of candy breaks into individual pieces of its own weight as it is carried beyond the end of lower belt 15. Apparatus for the practice of this method is also claimed.

---

This invention relates to confections and more particularly to a bite size confection consisting of a sheet-like body having an irregular edge formation and parallel top and bottom surfaces, and to a method and machine for making such a product.

Prior art confections and candies have generally been made in bars and other regular shapes. Some confections and candies which include solid particles, such as peanut brittle, have been made in sheets, usually in batches and broken. Such sheets, because of the irregularity of the contained particles, have not had flat parallel top and bottom surfaces and the solid particles have not always been substantially covered.

Continuous processes are obviously desirable in the manufacture of commercial products. However, one difficulty in the making of a sheet-like confection product by a continuous process involves the forming of the surfaces of such products. The confection must be cooled before the apparatus which forms the surface of the confection is removed in order to prevent the confection material from sticking to such apparatus.

In the formation of sheet-like confection products in this fashion it has been found that the operating temperatures must be adhered to closely. If the temperature is too low, the surface of the formed sheet does not have a smooth polished surface but appears cloudy. At still lower temperatures excessive pressures are required to form the confection material and it tends to stick to the compressing surface and may flow into other parts of the apparatus. Upper temperature limits for shaping are generally governed by the capacity of the cooling means since confections of the general type under consideration have high heat retaining qualities and the confections must be cool before removal of the shaping apparatus. If a cooling apparatus of capacity such that cooling was not a problem were provided, the upper temperature limit of the material to be shaped would be determined by the viscosity of the confection mass.

An object of this invention is to produce a confection product by a continuous batch method requiring a minimum expenditure of labor.

A further object is to produce a confection product having a smooth, glossy finish.

A further object is to produce a confection product having solid particles well imbedded therein.

A further object is to provide an improved method of producing a sheet-like confection product.

Other objects and advantages of the invention will be apparent from the following description taken in conjunction with the accompanying drawings in which:

FIG. 1 is a side view of the apparatus with the front side wall of the cooling tunnel removed and with arrows indicating the path of travel of cooling air;

FIG. 2, an enlarged side view of the confection compressing mechanism illustrated in FIG. 1, the intermediate portion being broken away and the cooling tunnel being removed;

FIG. 3, a fragmentary sectional view on the line 3—3 of FIG. 1 illustrating the forward portion of the confection shaping mechanism and with a portion of the upper belt broken away;

FIG. 3a, a fragmentary sectional view taken on the line 3a—3a of FIG. 1, illustrating the rearward portion of the confection shaping mechanism;

FIG. 4, a fragmentary sectional view taken on line 4—4 of FIG. 3;

FIG. 5, a fragmentary sectional view taken on the line 5—5 of FIG. 1, showing a portion of the cooling tunnel located at one side of the confection shaping mechanism;

FIG. 6, a fragmentary sectional view taken on the line 6—6 of FIG. 1 showing a portion of the cooling tunnel located at one side of the confection shaping mechanism; and FIG. 7, a perspective of confection products made according to the invention.

Briefly stated, in achieving these and other objects a plastic mass of confection is deposited on a moving surface and fed beneath a shaping surface to form sheet-like material. The temperature of the plastic mass initially supplied to the moving surface is high enough so that the product, after shaping and cooling, has a smooth glossy surface. It is also necessary that the temperature of the plastic mass when shaped be sufficiently high to permit smooth shaping without sticking of the confection to the apparatus or transfer to other parts. The plastic mass is supplied on the moving surface just before the shaping mechanism at a depth sufficiently higher than the final sheet thickness so that the confection has the desired characteristics and at which it is smoothly shaped. The temperature of the plastic mass when supplied must be low enough to permit adequate cooling within the cooling tunnel. Regulation of cooling is also achieved by control of the speed at which the confection product is carried through the cooling area. Adequate cooling is necessary to prevent sticking of the confection to the shaping surface and to sufficiently rigidify the final product so that it continues beyond the moving surface and breaks off under its own weight. The product is carried on an endless lower belt and shaped by being pressed thereagainst by an endless upper belt. Cooling air is supplied between the upper and lower run of each endless belt to cool the material in contact with the lower run of the upper belt and the upper run of the lower belt.

General description—apparatus

Referring to the drawings, FIG. 7, a confection product made according to this invention consists of pieces of irregular shape having upper surfaces 11 and flat lower surfaces 12 and an irregular edge formation 13. Particles 14 of crisp rice similar to that sold under the trade name of "Rice Krispies" are imbedded within a mixture of milk chocolate and toffee. A confection according to this invention is first mixed as described later, and then while at a temperature in which it is in a plastic condition is deposited onto a moving surface such as the upper run of a lower endless belt 15. It is then pressed into sheet form against the lower belt by a suitable shaping means such as the lower run of upper endless belt 16. The lower run 17 of upper belt 16 is parallel to and spaced from the upper run 18 of lower belt 15 by the desired sheet thickness, which is on the order of 3/16 to 1/4 inch.

It has been found desirable that the plastic mass 19 of the confection product to be shaped be accumulated to a level 20 which is appreciably higher than the final sheet thickness so that the shaping means smoothly forms a sheet 19' of confection between the belts from the mass. With the preferred product this level is three to four inches.

After shaping the product is cooled in a cooling tunnel 21 to a temperature at which the outer surface 22 of the upper belt 16 separates smoothly without sticking from the sheet of moving confection at the end 23 of its lower run 17.

At this stage the confection has sufficient rigidity so that when the outer surface 24 of the lower belt 15 departs from the upper run to the lower run 25 the sheet-like confection material continues to travel in a horizontal direction out of cooling tunnel 21 and beyond the end 26 of lower belt 15 until it breaks under the influence of its own weight and falls onto a collection table 27. If desired the resulting product can be broken into smaller bite-size pieces thereafter by hand or other means.

Belt and drive mountings

Lower belt 15 and upper belt 16 preferably are made of a flexible plastic material such as neoprene. Lower belt 15 travels over and on a support table 28 during its passage along upper run 18. Along this run lower belt 15 moves from left to right as seen in all figures of the drawings. At the downstream end 26 of the upper run 18, the belt leaves cooling tunnel 21 and passes over a roller 29 to lower run 25. During its passage through the lower run 25, it returns to cooling tunnel 21 and rollers 31 and 32 space it from the support table 28. Roller 33 directs the belt down around a drive roller 34. The belt returns to the level of lower run 25 and passes about roller 35 and then passes around forward end roller 36 and returns to the upper run 18. Roller 36 is horizontally adjustable by a screw thread mechanism 37 to take up any slack in belt 15.

Upper belt 16 is entrained about a shaping and drive roller 38 having a knurled circumferential surface 39 to increase friction between the roller and the belt. Compression roller 38 is mounted for vertical adjustment about support table 28 by a threaded adjustment mechanism 40. The lower run 17 of upper belt 16 is supported during its travel by the sheet of confection product and passes around far end roller 41 to its upper run 30. Rollers 42 and 43 support it during this upper passage. As upper run 30 leaves cooling tunnel 21, roller 44 presses upper run 30 into engagement with lower run 17 to prevent escape of cooling air trapped between the runs and the belt then passes again about the shaping roller 38.

Drive roller 34 for lower belt 15 and shaping roller 38 for upper belt 16 are driven by a common drive mechanism 45 having a speed control 46.

Shaping roller 38 of the upper belt is downstream from end roller 36 of lower belt 15. The portion of upper run 18 between these rollers serves as a confection receiving area 47. A pair of vertical guide rails 48 are mounted on each side of confection receiving area 47 a few inches within the sides of lower belt 15 and have their bottom edges 49 in contact with upper run 18. The downstream ends of the rails have a concave arc shape 50 as seen in FIG. 2 and engage outer surface 22 of upper belt 16 as it passes about shaping roller 38. Electrical heating strips 51 whose temperature is controlled by rheostat 52 maintain the guide rails at a desired temperature at which the confection product does not stick to them. Above confection receiving area 47, a supporting bracket 53 is mounted to hold a confection kettle 54.

Cooling tunnel

Cooling tunnel 21 consists of an upstream upper compartment 55, a downstream upper compartment 56, and a lower compartment 57. Upper compartments 55 and 56 are separated by a transverse vertical wall 58, the lower edge 59 of which is spaced slightly from upper run 30 of upper belt 16. An air-cooling mechanism 60 is mounted adjacent to compartment 55 and discharges cooled air to it through duct 61. Side walls 62 of the forward and rear compartments are spaced outwardly from the lateral edges 63 of belts 15 and 16 as can be seen in FIGS. 5 and 6. A horizontal strip 64 seals the space between support table 28 and side wall 62 to block passage of air between lower compartment 57 and upstream upper compartment 55 and also the upstream portion of downstream upper compartment 56. A space 65 is provided between support table 28 and side wall 62 at the downstream portion of upper compartment 56 to permit passage of cooling air therebetween as can be seen in FIG. 6. Ducts 66 are located at each side of cooling mechanism 60 to conduct air from lower compartment 57 to a filter 67 covering the inlet ducts 68 at each side of cooling mechanism 60.

Confection making method

Milk chocolate, toffee and crisp rice, such as that sold under the trademark "Rice Krispies," are mixed together in proportions and under conditions giving the desired taste qualities. The product is then placed on the lower belt 15 in confection receiving area 47 at a temperature of 84° F. to a depth of three to four inches. The lowest temperature at which the desirable glossy dark finish can be obtained is 82°. Below 82° a cloudy grayish finish is obtained. Below 78° shaping is so inefficient that chocolate sticks to the surfaces of the belts and is squeezed out and clogs the machine. The compressive force required for shaping increases drastically as the temperature decreases and is substantially greater at 82° than at 84°. For this reason the temperature is maintained as close as possible to 84°.

86° is the highest temperature at which applicant's cooling apparatus satisfactorily cools the compressed confection during its travel through the cooling tunnel. A longer or more efficient cooling tunnel might permit operation at a somewhat higher temperature, but in any event the temperature could not be indefinitely raised without the plastic mass becoming so viscous that it would not maintain its thickness after shaping and might flow off the belts.

The products mixed together to make the confection product can be varied. For example, other particles of solid products such as nuts or fruits might be supplied in place of the crisp rice or different mixtures of any of the products from which candy-like confections are made could be used instead of milk chocolate and toffee.

The temperatures at which the plastic mass can be shaped to give the desired glossy finish may vary with different confection mixtures. With any given confection product there is a lower temperature limit beyond which the compressed product will not have a smooth glossy finish and a still lower temperature limit beyond which efficient shaping will not take place. There are also upper limits determined by the efficiency of the cooling mechanisms and the viscosity of the confection products.

Operation

To initiate the candy-making process the cooling mechanism 60 is started to deliver air to the cooling tunnel 21. Drive mechanism 45 is started to drive the belts 15 and 16. A plastic mass of the confection is placed on confection receiving area 47 of the lower belt to a depth of 3 to 4 inches. The spacing of shaping roller 38 is adjusted to the desired sheet thickness which is of the order of 3/16 to ¼ inch. Speed control 46 is adjusted to drive the belts at the maximum speed at which portions of the confection will not stick to the surface of upper belt 16. This is in the range of 3 to 4 feet per minute with the preferred confection product. The temperature of guide rails 48 is adjusted by rheostat 52 to a level at which confection does not stick to it.

In operation cooling air is delivered from cooling mechanism 60 into the upstream upper compartment 55. Air passes between the runs of the upper belt and is carried between these runs into the downstream upper compartment 56. Some air also passes into the downstream upper compartment through the space between upper run 30 of belt 16 and lower edge 59 of transverse wall 58. Air passes from the downstream portion of downstream upper compartment 56 to the lower compartment 57 through spaces 65 between side walls 62 and the lateral edges 63 of belts 15 and 16. In the lower compartment the air passes between the runs of lower belt 15 and returns to the cooling mechanism through ducts 66, filter 67, and inlet 68.

At the downstream end of the mechine the rigid candy product is pushed by the material following it so that it continually projects over the end of the lower belt until it breaks its own weight and falls onto collection table 27. On this table it is broken into smaller pieces as desired.

It will be apparent that a method and apparatus for making a confection product has been provided which is capable of shaping a plastic mass of confection into a convenient sheet form, and thereafter cooling it to a temperature at which it readily separates from the shaping surface and at which it is rigid enough so that it will readily break into smaller pieces.

It will be obvious to one skilled in the art that various changes may be made in the invention without departing from the spirit and scope thereof and, therefore, the invention is not limited by that which is illustrated in the drawings and described in the specfication, but only as indicated in the accompanying claims.

What is claimed is:

1. Method of making confection consisting of
mixing the products to form a plastic mass,
placing the said plastic material on a lower endless belt having upper and lower runs,
passing the lower belt beneath an upper endless belt having upper and lower runs, said lower run being spaced from and parallel to the upper run of the lower belt,
introducing cooling air between the runs of said upper belt,
directing said cooling air from between the runs of the upper belt into a cooling chamber located above the upper belt,
directing the said cooling air from the first cooling chamber into a second cooling chamber located below the upper belt, and
directing the said cooling air from the second cooling chamber into an air cooling mechanism.

2. The method of making a confection consisting of
mixing products including chocolate and toffee to form a plastic mass,
placing said plastic mass on the upper run of a continuously moving endless lower belt between a pair of guide rails extending in the direction of movement of said endless belt,
passing the plastic mass between the lower belt and the lower run of an upper endless belt which is entrained about a roller which is substantially parallel to and is spaced from said upper run of the lower belt,
maintaining the level of said plastic mass at a height sufficiently greater than the spacing between said upper and lower belts so that material is smoothly shaped between said belts into a compact sheet,
moving the lower run of the upper belt and the upper run of the lower belt in substantially parallel planes into a cooling area,
supplying cooling air from a cooling means to the space between the upper and lower runs of the upper belt in a first cooling chamber,
directing said cooling air from between the runs of said upper belt into a second cooling chamber,
directing said cooling air from the second cooling chamber into a third cooling chamber located below the upper belt and open to the space between the runs of the lower belt,
directing said cooling air from the third cooling chamber back to the cooling means,
running said upper and lower belts at a speed sufficiently slow to cool the shaped plastic mass to a level at which it maintains its shape and does not adhere to the forming apparatus,
removing the said exterior surface of the upper belt from the lower run to the upper run at a distance sufficiently far within the cooling area so that the compressed plastic mass has cooled sufficiently so that it does not adhere to the upper belt,
directing the exterior surface of the lower belt from the upper run to the lower run at a point sufficiently far within the cooling area so that the shaped plastic mass has gained sufficient rigidity so that it continues to travel in a substantially parallel plane a sufficient distance beyond the end of the upper run so that it can break from its own weight, and
breaking said portions of the rigid plastic mass into smaller pieces.

3. Apparatus for forming a confection product comprising
means for shaping and advancing a plastic confection product including a moving surface engaging said product and travelling at the speed at which the product is advanced,
a cooling area surrounding the said moving surface and consisting of a first cooling chamber located on the upper side of the moving surface and a lower cooling chamber located beneath the lower side of the moving surface thereby cooling the surface of the product engaged by said moving surface to rigidify it and permit its separation from the moving surface without sticking thereto,
an air cooling means,
means for directing air from the cooling means to the first cooling chamber,
means for directing cooling air from the first cooling chamber to the lower cooling chamber, and
means for directing air from the lower cooling chamber back to the air cooling means.

4. Apparatus for forming a confection product comprising
a lower endless belt having an upper run and a lower run,
means for shaping a plastic confection product placed on the upper run of the lower belt comprising an upper endless belt having an upper run and a lower run which is spaced from and parallel to the upper run of the lower belt,
an air cooling means,
means for delivering cooled air to a cooling area,
said cooling area surrounding portions of the said upper and lower belts and including,
a first upper cooling chamber surrounding a portion of the upper belt and having side walls spaced from the lateral edges of the upper belt whereby cooling air can be directed between the runs of the upper belt,
a second upper cooling chamber separated from the first upper cooling chamber by a transverse wall and having side walls spaced from the lateral edges of the upper belt whereby cooling air can flow from the spaces between the runs of the upper belt into the second upper cooling chamber, a lower cooling chamber communicating with the second upper cooling chamber and surrunding a portion of the lower belt, and a duct leading from the lower cooling chamber to the said air cooling means.

5. The method of making confection comprising
mixing confection products to form a plastic mass,
placing the plastic mass onto a supporting surface while at a sufficiently high temperature to permit plastic shaping thereof,
gradually compressing the plastic mass on the supporting surface by moving the supporting surface beneath a driven shaping means having a unitary shaping surface converging with respect to said supporting surface and terminating in a cooled smooth guide portion mounted at a predetermined distance above and moving in the same direction and at the same speed as the supporting surface to form a confection sheet,
moving the supporting surface and the shaping surface at the same speed with the confection sheet held therebetween through a cooling area, and
maintaining the confection sheet in contact with the smooth guide portion and in said cooling area until its temperature is low enough to rigidify and separate from the guide portion without sticking thereto, whereby a smooth upper surface is formed on the confection.

6. The method of claim 5 in which the product mixed to form a plastic mass includes chocolate and in which the temperature of the mass is maintained between 82° F. and 86° F. before shaping, whereby minimum cooling and shaping force is required and the product after shaping and cooling has a glossy clear finish.

7. The method of claim 5 in which the product mixed to form a plastic mass includes chocolate and in which the temperature of the mass is maintained between 78° F. and 86° F. before shaping, whereby minimum cooling is required and the product after shaping and cooling has a glossy clear finish.

8. The method of claim 5 in which a pair of parallel vertical guide rails extend in the direction of surface movement and have their lower edges in contact with the lower moving surface.

9. The method of claim 8 including the step of heating the said guide rails to maintain the plastic mass at the temperature desired before shaping.

10. The method of claim 5 wherein the plastic confection consists of a mixture of chocolate and toffee and the level before shaping is maintained at a height of 3" to 4" above the moving shaping surface.

11. Apparatus for making a confection comprising
a lower conveyor belt having a horizontal run,
compressing means for shaping a plastic confection product placed on the lower belt comprising a shaping roller located above the lower belt's horizontal run and an upper belt entrained about the shaping roller and having a horizontal run spaced from and parallel to the lower belt's horizontal run,
means for supplying a mass of plastic confection product upon the lower belt at a point upstream of the shaping roller and upper belt to a level higher than the lower horizontal run of said upper belt, whereby the section of the upper belt running over the shaping roller defines a converging shaping surface which gradually compresses the mass of plastic confection to a thickness equal to the spacing between the opposed horizontal runs of the upper and lower belt,
a cooling area surrounding portions of the said horizontal runs of the upper and lower belts,
the facing surfaces of said horizontal runs of the upper and lower belts having a smooth finish, and
means for moving the runs of the upper and the lower belts at the same speed through the cooling area for a distance sufficient to permit a plastic confection product placed on the lower belt and shaped by the upper belt to sufficiently rigidify so that the upper belt can separate from the confection product without sticking.

12. The method of making confection comprising
mixing confection products to form a plastic mass,
placing the plastic mass onto a supporting surface while at a sufficiently high temperature to permit plastic shaping thereof,
moving the supporting surface beneath a driven shaping means having a unitary shaping surface with a cooled smooth guide portion mounted at a predetermined distance above and moving in the same direction and at the same speed as the supporting surface to form a confection sheet,
moving the supporting surface and the shaping surface at the same speed with the confection sheet held therebetween through a cooling area,
maintaining the confection sheet in contact with the smooth guide portion and in said cooling area until its temperature is low enough to rigidify and separate from the guide portion without sticking thereto, whereby a smooth upper surface is formed on the confection, and
removing the lower moving surface from beneath the confection at a point where it has sufficiently cooled to obtain sufficient rigidity to support itself, whereby the continuous movement of said lower surface carries the rigid confection to an area where it is unsupported and where it breaks of its own weight.

13. The method of claim 12 including the steps of further breaking into smaller pieces the pieces which have broken from their own weight.

References Cited
UNITED STATES PATENTS

| | | | |
|---|---|---|---|
| 1,416,483 | 5/1922 | Loveland | 18—26 X |
| 2,640,235 | 6/1953 | Hazelett | 164—278 X |
| 1,592,078 | 7/1926 | Cano | 62—380 X |
| 2,929,793 | 3/1960 | Hirsh | 18—4 |
| 2,956,519 | 10/1960 | Angell | 107—4 |
| 3,009,427 | 11/1961 | Bell | 107—54 |
| 3,044,111 | 7/1962 | Caughey | 18—4 |
| 3,207,088 | 9/1965 | McDonald | 107—54 X |
| 3,276,072 | 10/1966 | Politzer et al. | 18—4 |

WALTER A. SCHELL, *Primary Examiner.*

J. SHEA, *Assistant Examiner.*